(12) United States Patent
Dinh et al.

(10) Patent No.: US 7,650,358 B2
(45) Date of Patent: Jan. 19, 2010

(54) AUTO COMMIT N OPTION IN A RELATIONAL DATABASE

(75) Inventors: Hung T. Dinh, Austin, TX (US); Teng S. Hu, Austin, TX (US); David Lee, Round Rock, TX (US); Phong A. Pham, Austin, TX (US)

(73) Assignee: International Business Machines Corportion, Armonk, NY (US)

( * ) Notice: Subject to any disclaimer, the term of this patent is extended or adjusted under 35 U.S.C. 154(b) by 480 days.

(21) Appl. No.: 11/232,772

(22) Filed: Sep. 22, 2005

(65) Prior Publication Data

US 2007/0067350 A1  Mar. 22, 2007

(51) Int. Cl.
G06F 17/00 (2006.01)
G06F 12/00 (2006.01)
(52) U.S. Cl. .................. 707/102; 707/201
(58) Field of Classification Search .......... None
See application file for complete search history.

(56) References Cited

U.S. PATENT DOCUMENTS

| | | | |
|---|---|---|---|
| 5,226,158 A | 7/1993 | Horn et al. | |
| 5,826,253 A * | 10/1998 | Bredenberg | 707/2 |
| 5,930,806 A | 7/1999 | Taira et al. | |
| 6,085,189 A * | 7/2000 | Pirahesh et al. | 707/3 |
| 6,304,873 B1 * | 10/2001 | Klein et al. | 707/8 |
| 6,421,677 B1 * | 7/2002 | DeKimpe et al. | 707/102 |
| 6,564,203 B1 * | 5/2003 | Krishnaprasad et al. | 707/2 |
| 7,346,632 B2 * | 3/2008 | Bischof et al. | 707/201 |
| 2002/0010700 A1 | 1/2002 | Wotring et al. | |
| 2002/0091702 A1 * | 7/2002 | Mullins | 707/100 |
| 2003/0004930 A1 | 1/2003 | Minder et al. | |
| 2003/0172091 A1 * | 9/2003 | Norcott | 707/203 |
| 2005/0055384 A1 * | 3/2005 | Ganesh et al. | 707/202 |

* cited by examiner

*Primary Examiner*—Charles Rones
*Assistant Examiner*—Daniel Kuddus
(74) *Attorney, Agent, or Firm*—Justin Dillon; The Brevetto Law Group; Scott Charles Richardson

(57) ABSTRACT

Methods and systems are provided for executing a statement to make changes to data in a relational database while preventing the statement from failing due to the transaction log file becoming filled up. An AUTO COMMIT n option is provided for statements such as SQL statements in order to execute n data elements at a time. Each group of n data elements is committed after having been successfully executed in order to avoid filling up the transaction log file and causing the statement to fail.

14 Claims, 4 Drawing Sheets

AUTO COMMIT N OPTION IN A RELATIONAL DATABASE

BACKGROUND

1. Field

The present invention relates to databases, and more specifically to software, systems, and methods for improving the editing of databases.

2. Background

Databases are used to manipulate, store and report data. There are several different types of database structures, including flat databases and relational databases. A flat database has data organized in a single, two-dimensional array of data elements called a table. The Sports Team Table 110 of FIG. 1, taken by itself without 120 or 130, may be thought of as an example of a flat file table. Tables are organized in columns and rows. Each column of a table typically contains data elements of a similar data-type or value. For example, Sports Team Table 110 includes a Team ID column 111, a Team Name column 113, and a column 115 for the number of members per team. The data elements in each of the various rows may not be of similar types of values but are generally related to one another in some manner. Row 117 of table 110 contains data elements pertaining to the Girl's Swimming team.

FIG. 1 is a relational database 100 which includes tables 110, 120 and 130. Relational databases tend to be much more robust and versatile than flat databases. Relational databases store data in two or more interrelated tables in accordance with a schema defining the various interrelationships between the multiple tables of the relational database. For example, the relational database depicted in FIG. 1 includes table 110 with information about sports teams, table 120 with information about the members of a particular team, and table 130 with information about the events for a particular member of a team. The tables in a relational database may be interrelated in parent-child relationships. Table 110 is a parent of table 120. Table 120 is a child of table 110, but is a parent of table 130.

Relational databases generally have two main categories of instructions, Data Manipulation Language (DML) instructions and Data Definition Language (DDL) instructions. The DML instructions are used for manipulating, adding or deleting the data stored in relational database. DML instructions do not affect the database structure itself. Some of the most common DML commands include the SELECT, INSERT, UPDATE and DELETE commands for respectively extracting, adding, modifying and deleting data. The DDL commands, on the other hand, are used to alter the database objects containing data—that is, the database structure. The DDL commands do not directly affect the data. The database objects affected by DDL commands include the tables, indexes and relationships of the database structure, but not the data itself.

A single DML command executed in a large relational database may iterate through many thousands of records, often placing great demands on the system's computational resources. When thousands of records are inserted, updated or deleted by a conventional application, the transaction log file may become filled up, causing the statement to fail. When the CASCADE DELETE rule is specified the deletion of a record from a parent table cascades to the children of the parent, so the problem tends to be worse when trying to delete records from a parent table with many children records. For an application to handle a DML command affecting thousands of records, special steps must sometimes be taken to manage the INSERT, DELETE or UPDATE statement to all of the tables involved. Programmers working with conventional database applications have found a work-around for this problem. Programmers can avoid the problems which occur when the transaction log file fills up by drafting customized SQL code to retrieve the primary key values for the records to be updated or deleted, and storing them in the application's memory. The custom SQL code can then loop through the memory issuing the update or delete statement on the data records, one record at a time, and performs commit after every N records. In this way, the programmer's custom SQL code can avoid having the transaction log fill up. However, this work-around is somewhat inefficient inasmuch as it requires the use of customized code to prevent the transaction log overflow problem. What is needed is an improved way of executing DML commands in large relational databases to avoid straining the computational resources of the computer system.

SUMMARY

Embodiments disclosed herein address the above stated needs by providing systems, methods and computer program products for modifying data in a database in which a statement is received to alter a number of data elements of in the database, a parameter is detected which specifies the execution of the statement for a predetermined number n of the data elements. The statement is executed for the n data elements, and then the changes to the n data elements are committed once the statement has been executed for the predetermined number n of the data elements.

In various embodiments the statement may be an INSERT, a DELETE or an UPDATE statement in a variant of SQL. Various embodiments provide that the predetermined number n of data elements to be executed at a time is less than the number of data elements that would cause a failure of the statement due to a transaction log file filling up. In some embodiments the parameter may be an optional parameter specified as part of the statement, while in other embodiments the parameter may be a default parameter executed as part of the statement.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings.

DETAILED DESCRIPTION

Figure 1:
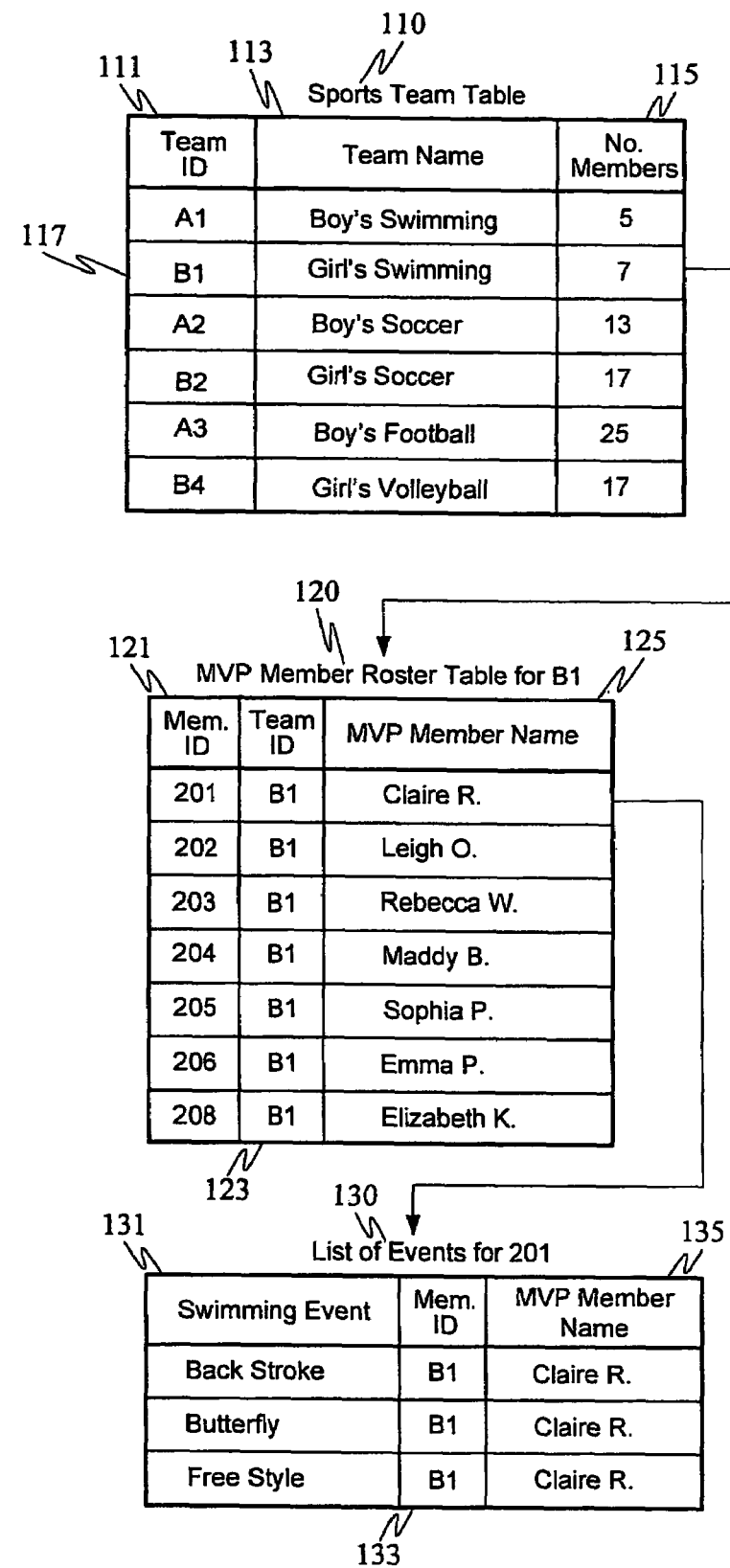
FIG. 1 depicts an exemplary relational database.

Relational databases are commonly used to store and update information for all sorts of businesses and organizations. The data in an active relational database seldom remains unchanged for very long, with new data frequently being added, or existing data being modified, deleted or otherwise manipulated. There is often a need to insert, update or delete thousands of records with a single statement. Performing such modifications using conventional methods can put a strain on the computer resources of the system and fill up the database transaction log causing the action to fail. This occurs in conventional applications when thousands of records are inserted, updated or deleted and the transaction log file fills up, which, in turn, causes the statement to fail. The transaction log file is a file managed by the database manager which stores the various changes made to a database in the order in which they were made. The transaction log file is used to aid in data recovery if a statement fails or the application decides to roll back the data.

The various embodiments disclosed herein provide the AUTO COMMIT n option, an efficient and effective means of preventing the transaction log file from overflowing. The embodiments may be implemented by adding the AUTO COMMIT n statement to any of the dialects of Structured Query Language (SQL, pronounced "sequel"), the ANSI standard computer language used to manipulate and structure the data in databases. SQL is the prevalent database query language and nearly all relational databases use some variant of SQL. For example, the three of the most widespread relational database programs—Microsoft SQL Server, Oracle and IBM DB2—each use an SQL dialect with commands and features which vary somewhat from each other. The AUTO COMMIT n option may be implemented in Microsoft SQL Server, Oracle and IBM DB2, or other database programs known to those of skill in the art.

The AUTO COMMIT n option instructs the database manager to commit after every n records are inserted, updated or deleted. Once the n records are committed, the changes or modifications to the records become permanent. An example on how this new option is specified is as described below, in conjunction with FIG. 2 and FIG. 3. When the AUTO COMMIT n option is specified, the number of records being updated or deleted is tracked, for example, by a database engine, and the transaction is committed after every n records are processed. If an error occurs during an operation with AUTO COMMIT n specified, data may be rolled back to the last successful commit point. The syntax for AUTO COMMIT n may be as follows for an INSERT statement: INSERT INTO target_table_name (column-names) SELECT FROM source_table_name WHERE search-condition AUTO COMMIT 1000.

The syntax for AUTO COMMIT n may be as follows for an UPDATE statement: "UPDATE company_info SET privacy_flg='y' WHERE ACTIVE='Y' AUTO COMMIT 1000." The syntax for AUTO COMMIT n may be as follows for a DELETE statement: "DELETE FROM company_info WHERE ACTIVE='N' AUTO COMMIT 1000." These syntax examples are merely illustrative in nature. Other formats for the AUTO COMMIT n statement are acceptable as well, and the AUTO COMMIT n statement itself may be called other names.

Figure 2:
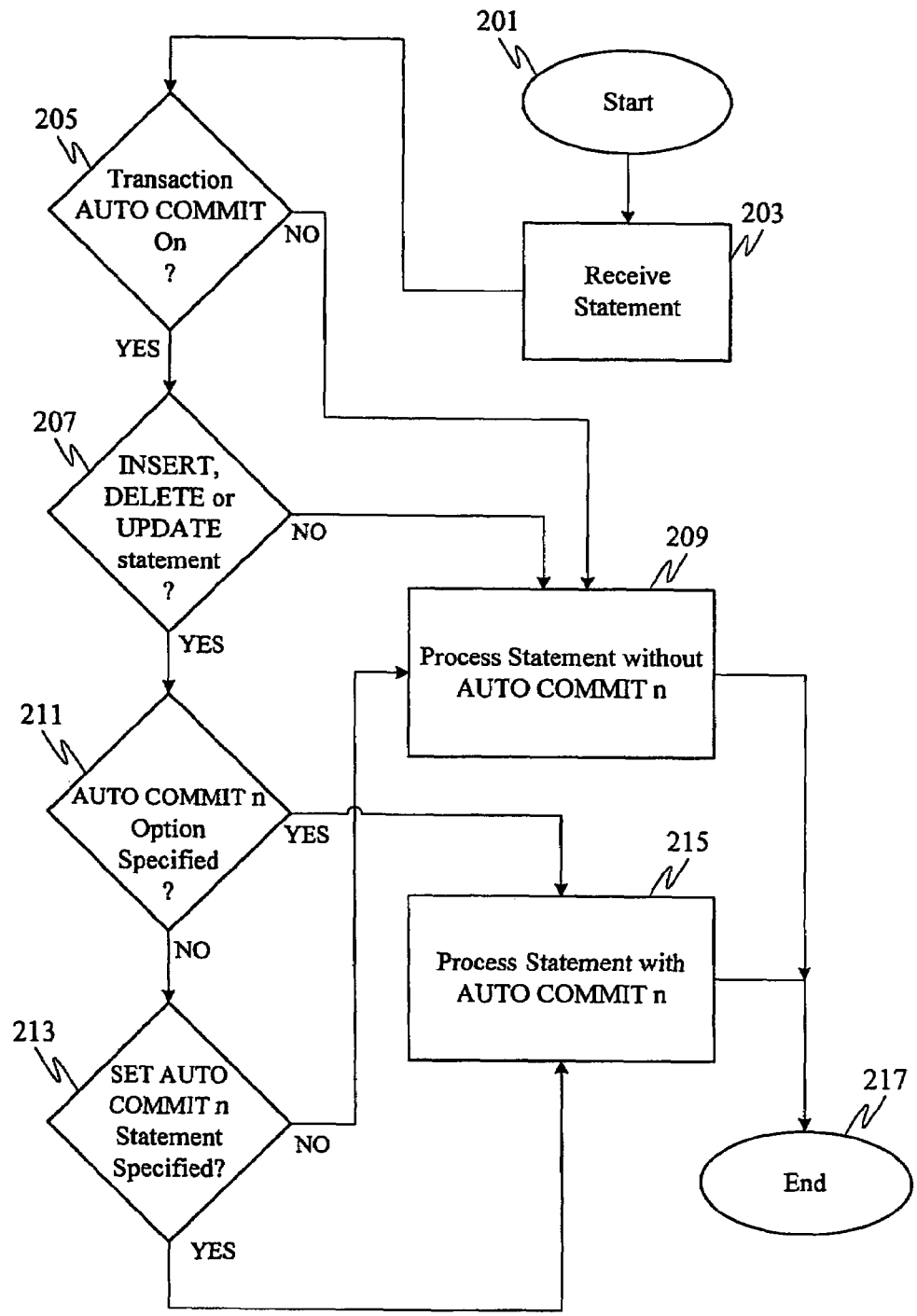
FIG. 2 is a flowchart depicting the use of the AUTO COMMIT n statement according to various embodiments of the invention.

FIG. 2 is a flowchart depicting the use of the AUTO COMMIT n feature in conjunction with an INSERT, UPDATE or DELETE statement operating on data elements in a relational database. The various activities depicted in the figure may be performed by, or under the control of, a database manager, database program, database engine or other logic that controls modifications and operations on the data elements of a relational database.

The method of FIG. 2 begins at 201 and proceeds to 203 where a statement is initiated or otherwise introduced which may possibly cause changes to data elements in a relational database. In a typical relational database data is frequently added, modified, deleted or otherwise manipulated in some manner. This is often done with an INSERT, DELETE or UPDATE statement which may modify thousands, or many thousands, of data records within the relational database. The number of data records affected may become very large when records from a parent table with many children tables are modified, and the modifications are subject to a CASCADE DELETE rule. When a CASCADE DELETE rule is in effect the changes due to a DELETE statement acting on parent data elements are cascaded to the children of the parents.

Once a statement has been introduced in 203 the method proceeds to 205 to determine whether the TRANSACTION AUTO COMMIT feature is turned ON or otherwise enabled, thus allowing the AUTO COMMIT n feature to be performed in executing an INSERT, DELETE or UPDATE statement on data elements. If it is determined in 205 that TRANSACTION AUTO COMMIT is not enabled in the database program the method proceeds along the "NO" path from 205 to 209 and the statement is processed without the AUTO COMMIT n option. Typically, the AUTO COMMIT n option and the SET AUTO COMMIT statement are available when the TRANSACTION AUTO COMMIT is enabled. If it is determined in 205 that the TRANSACTION AUTO COMMIT is enabled the method proceeds from 205 to 207 along the "YES" path to determine whether the statement is an INSERT, DELETE or UPDATE statement which will modify the data in the relational database.

If it is determined in 207 that the statement is not an INSERT statement, a DELETE statement or an UPDATE statement the method proceeds to 209 and the statement is processed without the AUTO COMMIT n option. Once the processing of the statement is completed in 209 the method proceeds to 217 and ends. Back in block 207, if it is determined that the statement is an INSERT statement, a DELETE statement or else an UPDATE statement, the method proceeds to 211 to determine whether the AUTO COMMIT n option is specified as part of the statement. In some embodiments the AUTO COMMIT n may be available by initially specifying it as an optional parameter in the INSERT, UPDATE or DELETE statements. If, in 211, it is determined that the AUTO COMMIT n optional parameter is specified in conjunction with the INSERT, UPDATE or DELETE statement, then the method proceeds from 211 along the "YES" branch to 215 to process the statement with the AUTO COMMIT n option. Further details of the statement execution of block 215 are provided in FIG. 3. However, if it is determined in 211 that the AUTO COMMIT n optional parameter is not specified as part of the INSERT, UPDATE or DELETE statement, then the method proceeds from 211 along the "NO" branch to 213.

In some embodiments a SET AUTO COMMIT n statement may be executed which will, in effect, enables the auto commit mode with a default value for n to be used in the event n is not specified by a user as an optional parameter in the INSERT, UPDATE or DELETE statement. When the SET AUTO COMMIT n has been executed, or is otherwise in effect, the AUTO COMMIT n parameter may be treated as a default parameter which is executed as part of the statement even though the user does not expressly specify the AUTO COMMIT n option in the INSERT, UPDATE or DELETE statement. If SET AUTO COMMIT n has a value specified for n, then the value of n is used in carrying out the AUTO COMMIT n option. However, if no value of n is specified in SET AUTO COMMIT n, then a predefined default value may be used. The syntax for using the default value for n may be simply to specify the AUTO COMMIT option without a value for n when SET AUTO COMMIT n is in effect, as follows: "UPDATE company_info SET privacy_flg'y' WHERE ACTIVE='Y' AUTO COMMIT."

Figure 3:
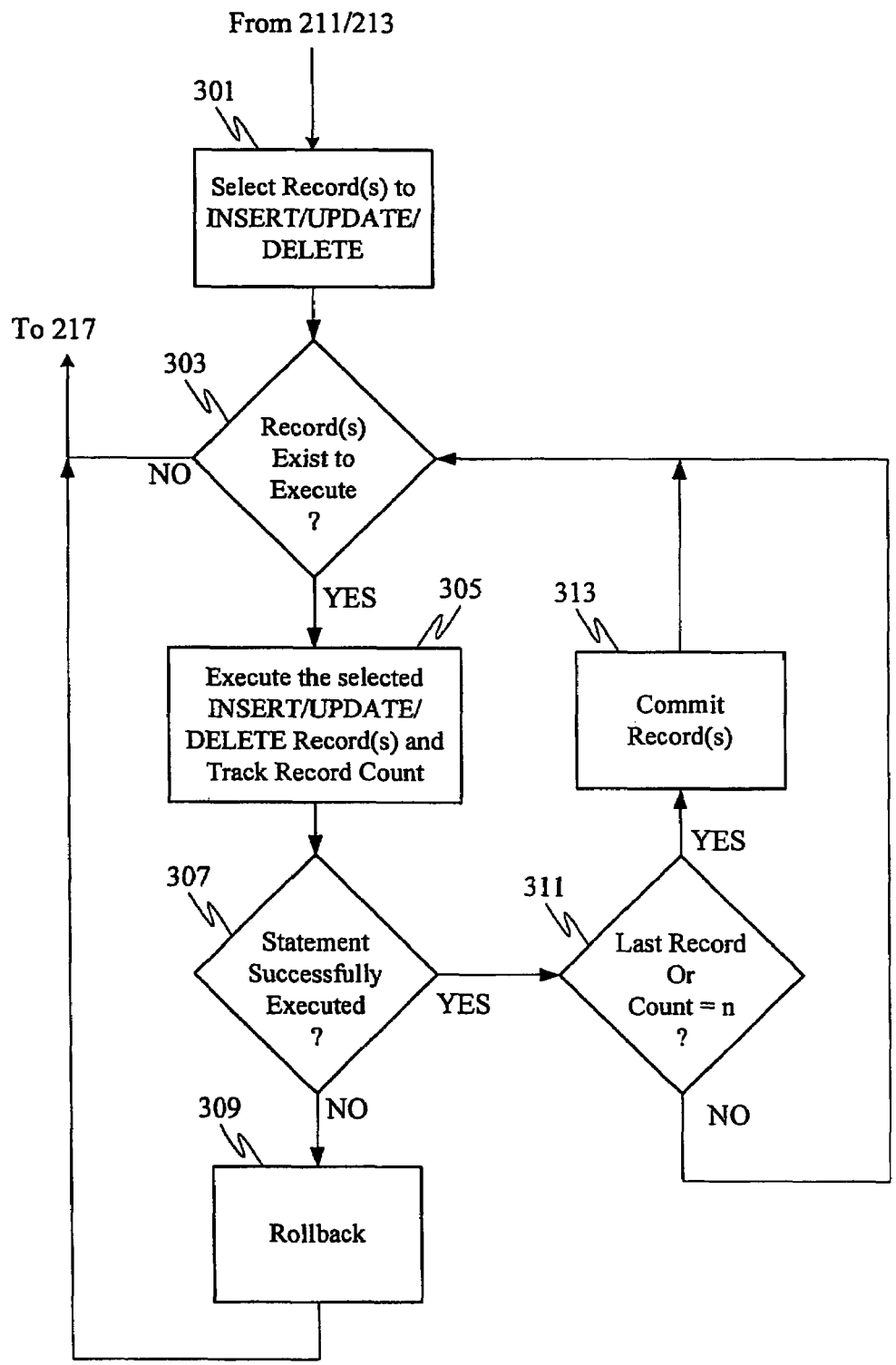
FIG. 3 is a flowchart depicting exemplary activities which take place in executing an AUTO COMMIT n statement according to various embodiments of the invention.

Returning to FIG. 2, if it is determined in 213 that SET AUTO COMMIT n is in effect, the method proceeds along the "YES" branch from 213 to 215 to process the statement in accordance with the AUTO COMMIT n feature. The discussion below in conjunction with FIG. 3 provides additional information about the execution of the INSERT, UPDATE or DELETE statement in block 215. If, in 213, it is determined that SET AUTO COMMIT n is not in effect, the method proceeds from 213 to 209 along the "NO" branch. Once the statement has been processed, either in 209 without AUTO COMMIT n or in 215 in accordance with the AUTO COMMIT n feature, the method proceeds to 217 and ends.

FIG. 3 is a flowchart depicting activities which take place in executing an INSERT, UPDATE or DELETE statement using the AUTO COMMIT n feature. The activities of FIG. 3 may take place, for example, in block 215 of FIG. 2. To begin the method of FIG. 3 for executing a statement with the AUTO COMMIT n option, in block 301 the data records are selected which will be affected by the INSERT, UPDATE or DELETE statement. If the CASCADE rule is in effect, the changes to records will be cascaded from affected parents to their child, if any. In many instances, having the CASCADE rule in effect causes the number of selected records to be very large, e.g., sometimes affecting tens of thousands of data records, or more. Once the affected data elements have been selected in 301 the method proceeds to 303 to determine whether records exist which need to be executed.

If it is determined in 303 that there are no records that need to be executed, or the records are otherwise unavailable for some reason, the method proceeds along the "NO" branch from 303 back to 217 and ends. However, if it is determined in 303 that there are records existing that need to be executed with the INSERT, UPDATE or DELETE statement, the method proceeds along the "YES" branch from 303 to 305 to execute the statement. In block 305 the INSERT, UPDATE or DELETE statement is executed on the selected records. The data records may be executed one at a time in 305, looping back through the routine until all n records have been executed, or the records may be executed more than one at a time. In 305 the number or executed records is tracked to keep a tally of the number of data records executed since the last time the records were committed. The tracking of the records may entail the use of a counter, a routine or logic configured to count the records, flags, or any other means to keep track of the number of uncommitted records which have been executed.

Upon completing 305 the method proceeds to 307 to determine whether the statement has been successfully executed for the record(s). If it is determined that the statement has not been successfully executed in 307 the method proceeds along the "NO" branch to 309 and the database records are rolled back to their previous state. Stored copies of the records from before the statement execution was attempted may be retrieved from the transaction log file to roll the database back to its previous state before the statement failed. Once the data records have been rolled back in 309 the method proceeds back to 217 and remaining records will not be processed. Back in 307, if it is determined that the statement was successfully executed, the method proceeds along the "YES" branch from 307 to 311.

Block 311 determines whether the successfully executed record(s) either include the last selected record to be executed or include the $n^{th}$ data record since the last time records were committed. If, in 311, it is determined that the successfully executed record is neither the last record to be executed nor the $n^{th}$ record, the method proceeds along the "NO" path back to 303 to determine whether any more of the selected records exist which have not yet been executed. If it is determined in 311 that the data records executed in 307 either include the $n^{th}$ data records since the last time records were committed or the last record to be executed was executed in 307, the method proceeds from 311 along the "YES" branch to 313. In 313 all the records which have been executed but not yet committed are committed. Upon completing 313 the method proceeds to 303 to again determine whether there are any records yet to be committed. If it is determined in 303 that no records exist the be executed the method proceeds along the "NO" branch to 217 and ends.

Figure 4:
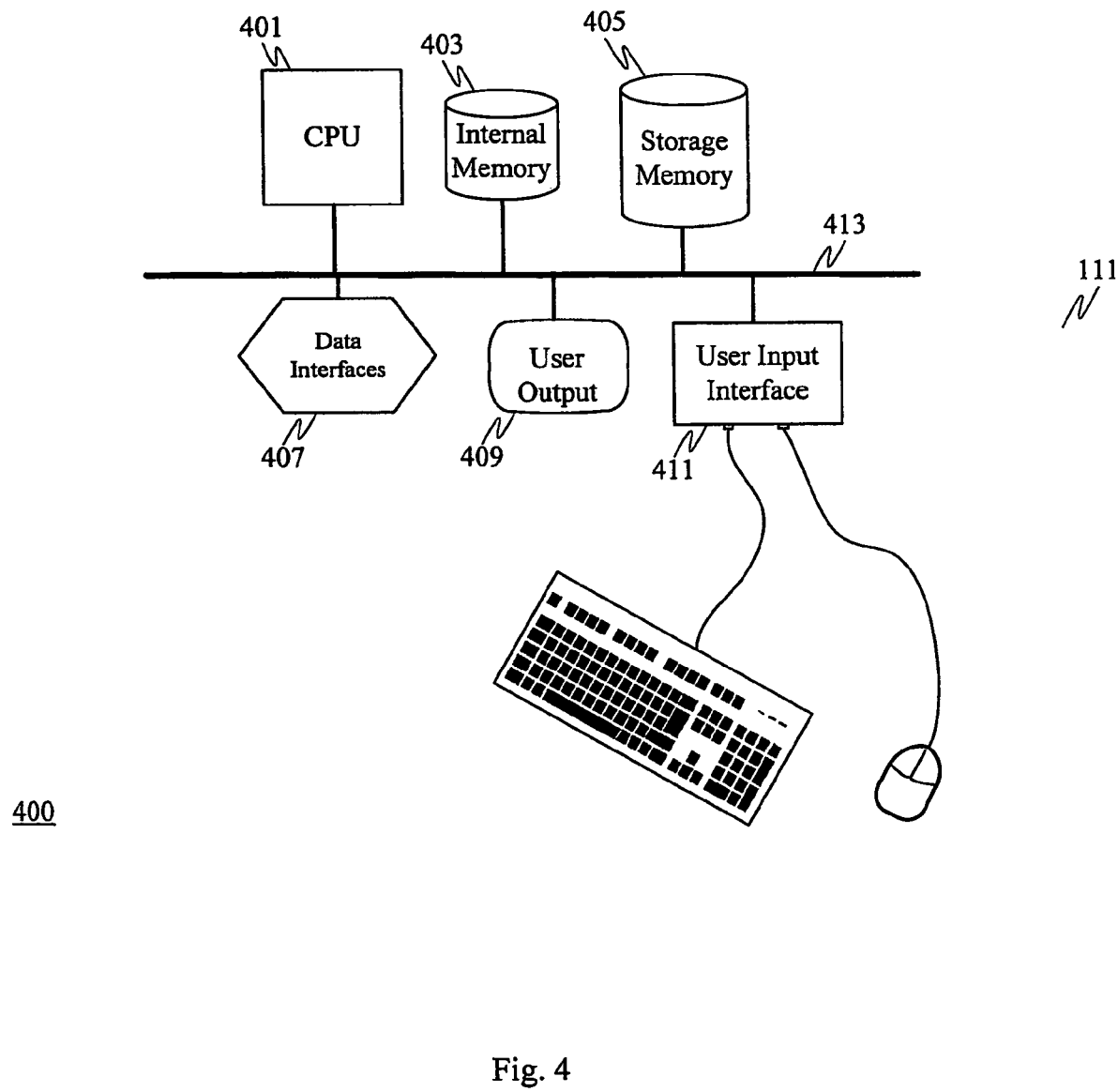
FIG. 4 depicts an exemplary hardware environment for implementing the various embodiments of the invention.

FIG. 4 depicts an exemplary hardware environment 400 for implementing the various embodiments. The figure shows a block diagram of a typical information handling system hardware configuration which includes a central processing unit (CPU) 401 containing circuitry or other logic capable of performing or controlling the processes, steps and activities involved in practicing the embodiments disclosed herein. The CPU 401 may be embodied as either a microprocessor or an application specific integrated circuit (ASIC), or may be a combination of two or more distributed processors or any other circuitry or logic capable of carrying out commands or instructions, for example, the routines of a computer program such as a database program. In various embodiments the CPU 401 runs a computer program or routine which performs one or more of the activities depicted in FIG. 2 and/or FIG. 3.

CPU 401 is interconnected to internal memory 403 and storage memory 405. The components of system 400 are typically via a bus 413, but may be connect using direct serial or parallel wired connections, wireless links, or a combination of these. The memory 403 may be any of several types of storage devices used for storing computer programs, routines, or code, including the instructions and data for carrying out activities of the various embodiments such as the activities discussed herein. The memory 403 and 405 may be implemented in any form suitable for storing data in a computer system, for example, as random access memory (RAM), read only memory (ROM), flash memory, registers, hard disk, or removable media such as a magnetic or optical disk, or other storage medium known in the art. The memory 403 and 405 may comprise a combination of one or more storage devices or technologies. The CPU 401 is configured to communicate with internal memory 403 and storage memory 405 via the bus 413 or by way of other wired or wireless communication links.

The information handling system 400 also includes one or more input/output (I/O) units such as user output 409 and user input 411. The user output 409 may be implemented as a monitor, for example, a cathode ray tube (CRT) or a liquid crystal display (LCD) screen or other type of computer screen. The user output 409 may include one or more audio speakers as well as a video monitor. The information handling system 400 typically includes one or more user input devices 411 such as a keyboard, a mouse, a tablet surface and pen, a microphone and speech recognition routine, or other like types of input/output devices. The user output 409 and user input 411 may include other devices known to those of ordinary skill in the art and suitable for use with a computer system. Quite often the information handling system 400 is configured to include data interface unit 407 for connecting to networks such as one or more of the Internet, a local area network (LAN), a wide area network (WAN), the Public Switched Telephone System (PSTN), or to a wireless telephone network. The data interface unit 407 may include a wired and/or wireless transmitter and receiver. Although the bus 413 is depicted as a single bus connecting all of the component parts of the system, the information handling system 400 may include two or more separate buses each connected to a subset of the system components.

AUTO COMMIT n is discussed above in terms of being implemented as an option to the INSERT, UPDATE or DELETE statements. However, in some embodiments AUTO COMMIT n may be a statement separate from INSERT, UPDATE or DELETE which acts upon these statements to limit the number of data elements executed before committing the changes. Further, although, for illustrative purposes, AUTO COMMIT n has been discussed herein in terms of use with the INSERT, UPDATE and DELETE statements, the AUTO COMMIT n option is not limited only to INSERT, UPDATE and DELETE. AUTO COMMIT n may also be implemented for any statements other than INSERT, UPDATE and DELETE which may modify, delete or otherwise affect data records.

Practitioners of ordinary skill in the art would know that some of the components or steps, as described above in the various embodiments, may be included or excluded, configured in a different manner or performed in a different order, with the rest of the components and activities still remaining as described. Such changes are anticipated to be within the scope of the invention. For example, block 213 may be omitted so that there is no SET AUTO COMMIT n feature, meaning that a value of n must be specified either at the time the INSERT, DELETE or UPDATE statement is created or in another prearranged manner. In such embodiments the flowchart of FIG. 2 could be configured with a "NO" branch from 211 to 209. Other steps or components may be included or excluded, configured differently or performed in a different order in practicing the various embodiments, as understood by those of ordinary skill in the art.

The invention may be implemented with any sort of processing units, processors and controllers (e.g., CPU 401 of FIG. 4) capable of performing the stated functions and activities. For example, the CPU 401 may be embodied as a microprocessor, microcontroller, DSP, RISC processor, or any other type of processor that one of ordinary skill would recognize as being capable of performing the functions described herein. A processing unit in accordance with at least one exemplary embodiment can operate computer software programs stored (embodied) on computer-readable medium such as the memories 403 and 405, e.g. hard disk, CD, flash memory, ram, or other computer readable medium as recognized by one of ordinary skill in the art, or the computer software programs may be transmitted wirelessly to the processing unit. The computer software programs can aid or perform the steps and activities described above. For example computer programs in accordance with at least one exemplary embodiment may include: source code for executing the INSERT, UPDATE or DELETE statement on the selected n data elements according to block 305; source code for determining whether the statement has successfully be executed according to block 307; source code for committing the n data elements changed in the relational database due to executing the INSERT, UPDATE or DELETE statement according to block 313; source code for determining whether more data elements exist to be processed by the INSERT, UPDATE or DELETE statement according to block 303; and source code for other activities and processes carried out in practicing the various embodiments.

The use of the word "exemplary" in this disclosure is intended to mean that the embodiment or element so described serves as an example, instance, or illustration, and is not necessarily to be construed as preferred or advantageous over other embodiments or elements. The term "database" may sometimes be defined to mean a collection of data records. The term "database management system" (DBMS) refers to the software program itself. These two terms, database and DBMS, are used interchangeably herein, as is common in the art. In particular, the term "database," as used herein, may refer to either the collection of data or the database software program. The term "relational database," as used herein, may include extensions (violations) of the relational model. That is, a DBMS may be a relational database if it supports relational operations, regardless of whether it enforces strict adherence to the relational model, as understood by those of ordinary skill in the art. The terms data elements, data records, bits of data, cells, are used interchangeably herein and all intended to mean information stored in cells of a database.

The DBMS statement for practicing the various embodiments disclosed herein has been referred to as the AUTO COMMIT n statement. However, "AUTO COMMIT n" is merely a term coined by the inventors. The statement, parameter or option for practicing the various embodiments may be named any acceptable term. The term "execute," is sometimes intended to mean to run the statement without understanding the internal logic, and the term "process" sometimes requires doing a particular action or an action appropriate for the situation. Typically, from an application standpoint, the application typically "executes" the statement. But from the perspective of a database manager, the statement may be "processed" by performing the appropriate actions such as logging records, setting flags to prepare for the commit, or doing a rollback of the statement. However, as used herein the terms "execute" and "process" may be considered interchangeable.

The description of the various exemplary embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the spirit and scope of the present invention.

What is claimed is:

1. A method in a database, the method comprising:
   receiving a statement to alter a plurality of data elements in the database;
   detecting a parameter specifying execution of the statement for a predetermined number n of the plurality of data elements, wherein the parameter is AUTO COMMIT n;
   executing the statement for said predetermined number n of the data elements;
   committing changes in the data elements upon executing the statement for said predetermined number n of the data elements;
   determining whether all of said plurality of data elements have been altered; and
   committing the changes to any of the plurality of the data elements determined to be uncommitted;
   wherein there is a maximum number of the data elements that can be altered without resulting in failure of the statement, said plurality of data elements to be altered being greater than the maximum number and said predetermined number n is less than the maximum number.

2. The method of claim 1, wherein the failure of the statement is due to a transaction log file filling up.

3. The method of claim 1 wherein the statement is an INSERT statement, an UPDATE statement or a DELETE statement.

4. The method of claim 1 wherein the parameter is an optional parameter specified as part of the statement.

5. The method of claim 1 wherein the parameter is a default parameter executed separate from the statement.

6. The method of claim 1 wherein the database is a relational database.

7. The method of claim 1 further comprising:
   determining whether changes have been committed for all of said plurality of data elements; and
   executing the statement for a next number n of the data elements, wherein not all of the changes have been committed for said plurality of data elements.

8. A computer readable storage medium having stored thereon a computer program product, wherein execution of the computer program product causes a computer to:
   receive a statement to alter a plurality of data elements in the database;
   detect a parameter specifying execution of the statement for a predetermined number n of the plurality of data elements, wherein the parameter is AUTO COMMIT n;
   execute the statement for said predetermined number n of the data elements; and
   commit changes in the data elements upon executing the statement for said predetermined number n of the data elements;
   determine whether all of said plurality of data elements have been altered; and
   commit the changes to any of the plurality of the data elements determined to be uncommitted;
   wherein there is a maximum number of the data elements that can be altered without resulting in failure of the statement, said plurality of data elements to be altered is greater than the maximum number and said predetermined number n is less than the maximum number.

9. The computer readable storage medium of claim 8, wherein the failure of the statement is due to a transaction log file filling up.

10. The computer readable storage medium of claim 8, wherein the statement is an INSERT statement, an UPDATE statement or a DELETE statement.

11. The computer readable storage medium of claim 8, wherein the parameter is an optional parameter specified as part of the statement.

12. The computer readable storage medium of claim 8, wherein the parameter is a default parameter executed separate from the statement.

13. The computer readable storage medium of claim 8, wherein the database is a relational database.

14. The computer readable storage medium of claim 8, further comprising:
   determining whether changes have been committed for all of said plurality of data elements; and
   executing the statement for a next number n of the data elements wherein not all of the changes have been committed for said plurality of data elements.

* * * * *

UNITED STATES PATENT AND TRADEMARK OFFICE
CERTIFICATE OF CORRECTION

PATENT NO. : 7,650,358 B2  Page 1 of 1
APPLICATION NO. : 11/232772
DATED : January 19, 2010
INVENTOR(S) : Dinh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 894 days.

Signed and Sealed this

Twenty-third Day of November, 2010

David J. Kappos
*Director of the United States Patent and Trademark Office*